A. V. DEMMITT.
EGG TRAY.
APPLICATION FILED NOV. 21, 1918.
1,332,110. Patented Feb. 24, 1920.
2 SHEETS—SHEET 1.
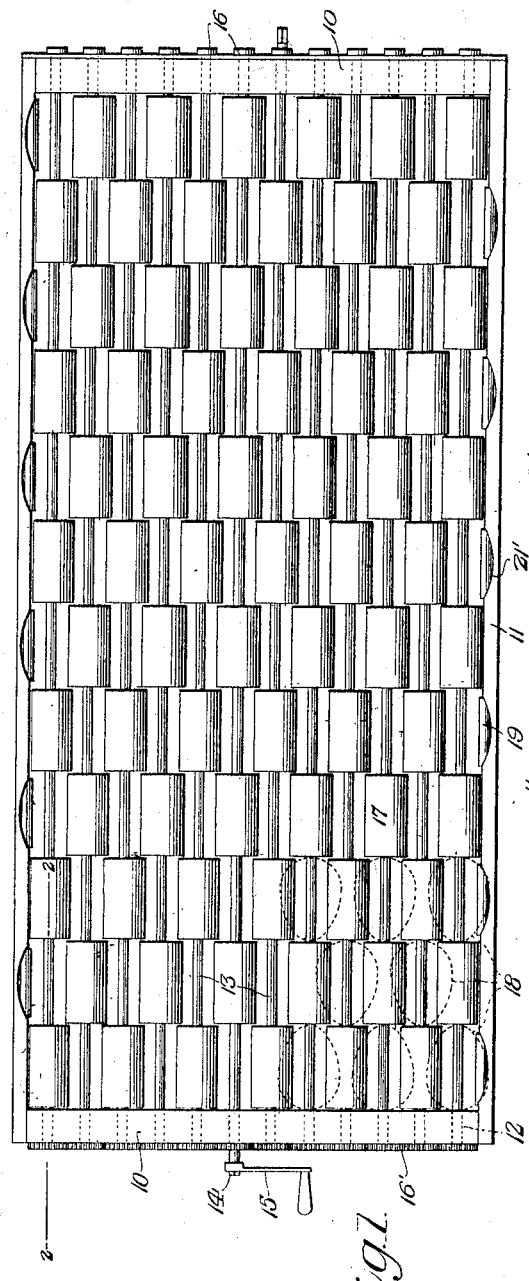
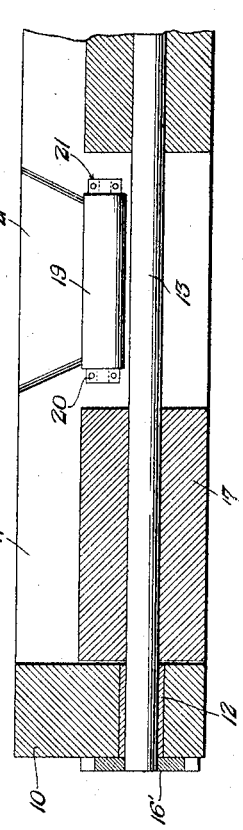
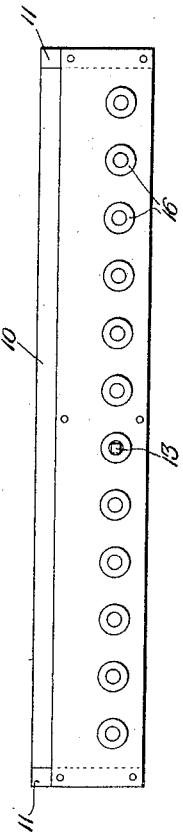
Inventor
A. V. Demmitt,
Witnesses
J. H. Crawford
By Victor J. Evans
Attorney A. V. DEMMITT.
EGG TRAY.
APPLICATION FILED NOV. 21, 1918.
1,332,110.
Patented Feb. 24, 1920.
2 SHEETS—SHEET 2.
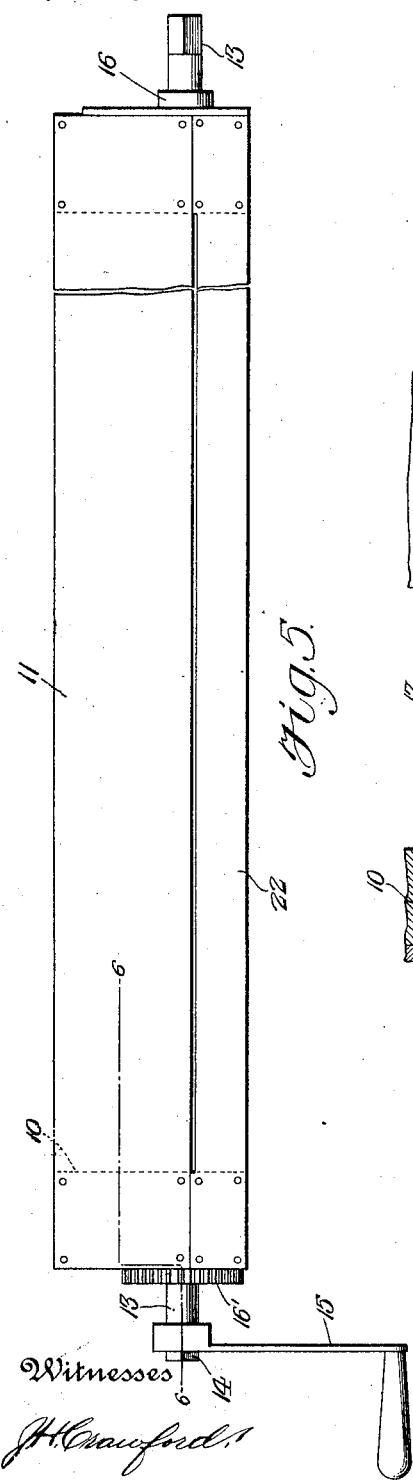
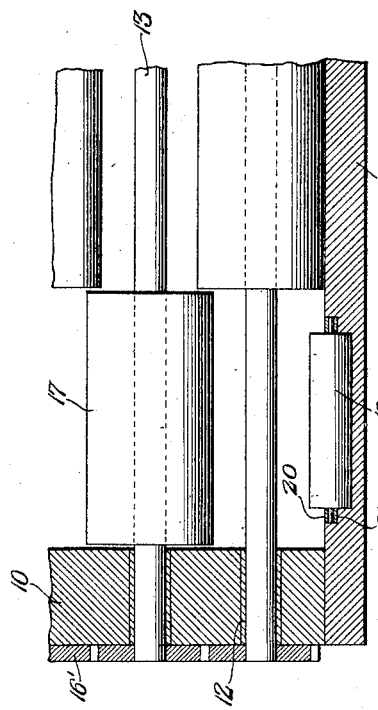
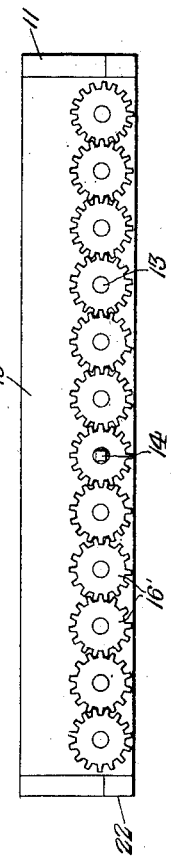
Inventor
A. V. Demmitt,
By Victor J. Evans
Attorney
Witnesses
J H Crawford

UNITED STATES PATENT OFFICE.

ALBERT V. DEMMITT, OF NEW CARLISLE, OHIO.

EGG-TRAY.

1,332,110.  Specification of Letters Patent.  Patented Feb. 24, 1920.

Application filed November 21, 1918. Serial No. 263,617.

*To all whom it may concern:*

Be it known that I, ALBERT V. DEMMITT, a citizen of the United States, residing at New Carlisle, in the county of Clark and State of Ohio, have invented new and useful Improvements in Egg-Trays, of which the following is a specification.

This invention has reference to an improved method of artificial incubation and is particularly directed to an egg turning device for use in incubators.

Among other objects the improvement aims to provide a simple and cheap, yet efficient and reliable egg turning device whereby the eggs are supported upon cradles normally held against movement but being susceptible, through the medium of simple means for turning and causing the eggs supported thereon to be likewise turned.

A further object of the invention is to produce an egg turning tray which may be arranged in any ordinary construction of incubators, wherein a plurality of longitudinally arranged shafts are employed, each of the said shafts having enlargements in the nature of spaced rolls thereon, whereby the ends of the rolls on one of the shafts will be arranged adjacent to but out of contact with the rolls on the adjacent shafts, and each pair of opposite rolls in alternate series providing a cradle for an egg, means is provided for simultaneously turning all of the shafts and consequently revolving all of the rolls to cause the confronting series of cradles to turn in opposite directions, and likewise turn the eggs deposited on the cradles.

It is a further object of the invention to produce an egg tray for incubators wherein the eggs may be turned without necessitating the handling of the same.

Other objects and advantages will present themselves as the nature of the invention is better understood, reference being had to the accompanying drawings, in which:

Figure 1 is a top plan view of the improvement showing the arrangement of the eggs thereon;

Fig. 2 is an enlarged sectional view approximately on the line 2—2 of Fig. 1, the eggs being removed;

Fig. 3 is a view of the device looking toward one of the ends thereof;

Fig. 4 is a similar view looking toward the other end;

Fig. 5 is a side elevation of the device; and

Fig. 6 is a detail horizontal sectional view approximately on the line 6—6 of Fig. 5.

As disclosed by the drawings the tray comprises a substantially rectangular frame, the ends 10 thereof being thicker than the sides 11. Arranged longitudinally of the frame, and extending through suitable spaced bearing openings 12 in the ends thereof, and adjacent to the bottom of the said frame is a plurality of shafts 13. The shafts are spaced an equidistance from each other and are of an even number, twelve being shown in the drawings. Two intermediate shafts 13 have their opposite ends projected a greater distance than the remaining shafts, the said ends being squared as at 14 to receive thereon the socket of a removable operating crank 15. One of the ends 10 preferably has its outer face provided with a metallic plate formed with openings through which the shafts extend, and the extending ends of the shafts have secured thereon collars 16. The opposite ends of the shafts, or the ends projecting from the second end of the frame have secured thereon pinions 16 which mesh, and by this arrangement it will be seen that the turning of either of the intermediate shafts will simultaneously turn the remaining shafts. The interengaging gears or pinions between the shafts cause the alternating shafts to turn in opposite directions, as will be readily apparent.

Secured upon the shafts are spaced rolls, 17, so arranged that the ends of the rolls on certain of the shafts are arranged intermediate but out of contact with the rolls on the remaining shafts. The end rolls are slightly out of contact with the end members of the frame. The space between the transverse series of rolls and the shafts upon which the adjacent series of rolls are secured provide cradles for the eggs 18, and the cradles between the rolls spaced by the shaft of the intermediate rolls from the sides of the frame have their outer portions or sides formed by small rolls 19 journaled on shafts 20 in suitable pockets 21 on the side members 11 of the frame. The sides, above the small rolls 19 are of a length equaling that of the rolls 17, and the sides 11, outward of the rolls 19 are formed with concaved depressions 21.

The points of the eggs in one of the transverse series of cradles contact with the butts of the eggs in the front or next series of cradles. This, together with the turning of the rolls in reverse directions is an important feature of the construction, as should the eggs in the adjacent cradles contact, the reverse movement imparted thereto by the rotation of the rolls will positively insure the turning of the eggs in an opposite direction. Should the eggs not contact it will be apparent that the turning of the rolls will likewise turn the said eggs.

From experience I have found that the direct contact of the lower edges of the sides of a frame, such as above described, with the cleats or supports in the incubator for the tray interferes with the free turning of the end rolls, or the rolls nearest the sides of the tray and likewise prevents the free insertion or removal of the tray from the incubator. To obviate this, I have secured to the lower corners of the sides 10, below the sides 11, strips 22 which are suitably spaced from the lower edges of the sides 11.

The device, it will be noted, does not reduce the egg capacity of the tray.

It is believed, from the foregoing description, when taken in connection with the drawings that the simplicity of the construction and the advantages thereof will be apparent without further detailed description.

Having thus described the invention, what is claimed as new, is:—

1. In a device for the purpose set forth, a plurality of longitudinally arranged spaced rolls disposed to arrange the ends of one of the transverse series of rolls intermediate of the ends of the next transverse series of rolls, each pair of opposite rolls in alternate series providing a cradle for an egg, and means for simultaneously turning all of the rolls.

2. In a device for the purpose set forth, a plurality of spaced longitudinally arranged rolls disposed whereby the ends of the alternating transverse series of rolls will be positioned between, but out of contact with the intermediate transverse series of rolls, each pair of opposite rolls in alternate series providing cradles for eggs, and means for revolving the rolls to cause the adjacent series of cradles to turn in reverse directions.

3. In a device for the purpose set forth, a tray, slats secured to the ends of said tray below the sides thereof, a plurality of longitudinally arranged spaced rolls in the tray positioned whereby the confronting ends of one of the transverse series of rolls will be disposed intermediate the ends of the adjacent transverse series of rolls, each pair of opposite rolls in alternate series providing a cradle for an egg, and means for simultaneously revolving all of the rolls for turning the adjacent series of cradles in opposite directions.

4. In a device for the purpose set forth, a tray comprising a frame, a plurality of parallel longitudinally disposed shafts journaled in the ends of the frame, spaced rolls secured on the shafts and positioned to arrange each pair of rolls on the alternate series of shafts opposite each other, and each pair of opposed rolls providing a cradle for an egg, and means for simultaneously revolving all of the shafts to cause the alternating series of cradles to turn in reverse directions.

5. In a device for the purpose set forth, a frame comprising a tray, a series of spaced longitudinal shafts journaled in the ends of said tray, a plurality of spaced rolls on each of the shafts arranged whereby the ends of certain of the transverse series of rolls will be disposed intermediate of the ends of the adjacent series of rolls, and each pair of opposite rolls in alternate series providing a cradle for an egg, rolls journaled on the sides of the frame and arranged between the rolls on the shafts nearest the sides of the frame, and means for simultaneously turning all of the shafts to cause the alternating series of cradles to turn in opposite directions.

In testimony whereof I affix my signature.

ALBERT V. DEMMITT.